(12) United States Patent
Mann et al.

(10) Patent No.: US 10,245,652 B2
(45) Date of Patent: Apr. 2, 2019

(54) ROTATING TOOL HOLDER ASSEMBLY FOR MODULATION ASSISTED MACHINING

(71) Applicant: M4 Sciences LLC, Wast Lafayette, IN (US)

(72) Inventors: James B. Mann, West Lafayette, IN (US); Seong Eyl Lee, West Lafayette, IN (US)

(73) Assignee: M4 Sciences LLC, West Lafayette, IN (US)

( * ) Notice: Subject to any disclaimer, the term of this patent is extended or adjusted under 35 U.S.C. 154(b) by 541 days.

(21) Appl. No.: 14/072,700

(22) Filed: Nov. 5, 2013

(65) Prior Publication Data
US 2014/0241821 A1    Aug. 28, 2014

Related U.S. Application Data

(60) Provisional application No. 61/722,527, filed on Nov. 5, 2012.

(51) Int. Cl.
*B23B 37/00* (2006.01)
*B23B 29/12* (2006.01)
(Continued)

(52) U.S. Cl.
CPC ............ *B23B 37/00* (2013.01); *B23B 29/125* (2013.01); *B23B 31/02* (2013.01);
(Continued)

(58) Field of Classification Search
CPC ..... B23B 29/125; B23B 31/02; Y10T 408/23; B25D 2209/00; B25D 2209/005; B25D 2209/007
(Continued)

(56) References Cited

U.S. PATENT DOCUMENTS

| 655,868 A | 8/1900 | Holtgen |
| 2,453,136 A | 9/1948 | Karweit |

(Continued)

FOREIGN PATENT DOCUMENTS

| DE | 2436340 | 3/1975 |
| DE | 9212079 | 1/1993 |

(Continued)

OTHER PUBLICATIONS

J. Pi and X.P. Xu; Design of Integration Tool-Holder System for Ultrasonic Vibration Machining Using Contactless Inductive Power Transfer; May 5, 2009 at www.scientific.net., Switzerland.

*Primary Examiner* — Alexander M Valvis
*Assistant Examiner* — Lucas E. A. Palmer
(74) *Attorney, Agent, or Firm* — Indiano & McConnell, LLC; E. Victor Indiano; John T. Woods

(57) ABSTRACT

Assemblies, apparatus, and methods are described for designing modulation tool holder assemblies and installations for modulation-assisted machining, and, in particular, for rotating machining applications that benefit from the sinusoidal modulation motion while cutting fluids are simultaneously applied through the tool. In addition, the design of rotating modulation tool holder assemblies and systems is described. In a tool holder assembly for modulation in a rotating spindle, the electric power and/or control signals are transferred from an external source to the modulation tool holder assembly installed in the rotating machine spindle. Similarly, the high-pressure cutting fluid is transferred from a stationary source to the rotating tool holder assembly for modulation.

19 Claims, 7 Drawing Sheets

(51) Int. Cl.
*B23Q 11/10* (2006.01)
*B23B 31/02* (2006.01)

(52) U.S. Cl.
CPC ...... *B23Q 11/1023* (2013.01); *B23B 2231/24* (2013.01); *B23B 2250/12* (2013.01); *B23B 2260/036* (2013.01); *B23B 2260/062* (2013.01); *B23B 2260/102* (2013.01); *B23B 2260/108* (2013.01); *Y10T 408/23* (2015.01)

(58) Field of Classification Search
USPC .................. 173/104; 408/56, 59, 57, 60, 61; 137/318
See application file for complete search history.

(56) References Cited

U.S. PATENT DOCUMENTS

| | | | |
|---|---|---|---|
| 2,452,211 A | 10/1948 | Rosenthal | |
| 2,514,759 A | 7/1950 | Hallden | |
| 2,515,539 A | 7/1950 | Wichman | |
| 2,521,900 A | 9/1950 | Clark | |
| 3,003,372 A * | 10/1961 | Findley | B23B 47/34 408/17 |
| 3,015,914 A | 1/1962 | Roney | |
| 3,028,771 A | 4/1962 | Bunnell | |
| 3,056,320 A | 10/1962 | Findley | |
| 3,105,402 A | 10/1963 | Mieville | |
| 3,174,404 A | 3/1965 | Findley | |
| 3,303,522 A * | 2/1967 | Kumabe | B23G 7/00 408/128 |
| 3,398,609 A * | 8/1968 | Schott | B23Q 11/10 173/61 |
| 3,460,410 A * | 8/1969 | Briles | B23B 51/06 408/57 |
| 3,471,724 A | 10/1969 | Balamuth | |
| 3,504,516 A | 4/1970 | Sundberg | |
| 3,513,309 A | 5/1970 | Hehemann | |
| 3,559,259 A | 2/1971 | Kumabe | |
| 3,561,462 A * | 2/1971 | Jugler | B06B 1/06 173/117 |
| 3,614,484 A * | 10/1971 | Shoh | B24B 1/04 228/1.1 |
| 3,619,671 A * | 11/1971 | Shoh | B06B 1/06 310/325 |
| 3,713,045 A | 1/1973 | Usuda et al. | |
| 3,754,487 A * | 8/1973 | Nachtigal | B23B 1/00 318/561 |
| 3,837,121 A | 9/1974 | Schirmer | |
| 4,052,132 A | 10/1977 | Oates | |
| 4,104,900 A | 8/1978 | Nels | |
| 4,261,675 A | 4/1981 | Zankl | |
| 4,559,600 A * | 12/1985 | Rao | G05B 19/4163 340/680 |
| 4,640,156 A | 2/1987 | Nakagawa et al. | |
| 4,646,595 A | 3/1987 | Slee | |
| 4,653,235 A | 3/1987 | Farmer | |
| 4,667,546 A | 5/1987 | Dombrowski et al. | |
| 4,911,044 A | 3/1990 | Mishiro et al. | |
| 5,021,941 A | 6/1991 | Ford et al. | |
| 5,113,728 A | 5/1992 | Medeksza | |
| 5,140,773 A * | 8/1992 | Miwa | B23B 37/00 451/1 |
| 5,144,771 A * | 9/1992 | Miwa | B23B 37/00 451/165 |
| 5,291,812 A | 3/1994 | Yen et al. | |
| 5,331,870 A | 7/1994 | Chin-Long | |
| 5,342,152 A * | 8/1994 | Medeksza | B23B 25/02 408/1 R |
| 5,361,543 A * | 11/1994 | Bory | B06B 3/02 451/155 |
| 5,558,477 A | 9/1996 | Browning et al. | |
| 5,778,745 A | 7/1998 | Furusawa et al. | |
| 5,857,814 A | 1/1999 | Jang | |
| 5,911,802 A | 6/1999 | Kimura et al. | |
| 5,939,146 A | 8/1999 | Lavernia | |
| 5,957,016 A | 9/1999 | Segalman et al. | |
| 6,084,363 A | 7/2000 | Mizumoto | |
| 6,122,999 A | 9/2000 | Durazo et al. | |
| 6,123,270 A * | 9/2000 | Hara | B05B 7/02 239/422 |
| 6,202,521 B1 | 3/2001 | Rossetti et al. | |
| 6,234,728 B1 * | 5/2001 | Brun-Picard | B23B 29/125 408/17 |
| 6,465,931 B2 | 10/2002 | Knowles et al. | |
| 6,599,178 B1 | 7/2003 | Gluche et al. | |
| 6,706,324 B2 | 3/2004 | Chandrasekar et al. | |
| 6,718,178 B1 | 4/2004 | Bedi et al. | |
| 6,731,047 B2 * | 5/2004 | Kauf | B06B 3/00 310/317 |
| 6,762,535 B2 * | 7/2004 | Take | B23B 37/00 310/323.08 |
| 6,925,915 B1 | 8/2005 | Claesson et al. | |
| 7,131,797 B2 | 11/2006 | Kai et al. | |
| 7,175,506 B2 * | 2/2007 | Fiebelkorn | B23B 37/00 451/11 |
| 7,216,571 B2 | 5/2007 | Schreiber et al. | |
| 7,587,965 B2 * | 9/2009 | Mann | B23B 27/045 184/6.1 |
| 7,628,099 B2 | 12/2009 | Mann et al. | |
| 7,816,840 B2 * | 10/2010 | Tang | B23B 31/083 310/323.18 |
| 7,824,247 B1 * | 11/2010 | Bar-Cohen | B23B 37/00 125/28 |
| 8,870,500 B2 * | 10/2014 | Short | B23B 29/125 408/17 |
| 8,905,689 B2 * | 12/2014 | Short | B23B 29/125 279/103 |
| 2002/0150496 A1 | 10/2002 | Chandrasekar et al. | |
| 2003/0001456 A1 * | 1/2003 | Kauf | B06B 3/00 310/323.18 |
| 2003/0085632 A1 * | 5/2003 | Take | B23B 37/00 310/323.19 |
| 2005/0039513 A1 | 2/2005 | Fabris | |
| 2005/0167008 A1 | 8/2005 | Chandrasekar et al. | |
| 2006/0099039 A1 * | 5/2006 | Maki | B23B 29/125 408/1 R |
| 2006/0128283 A1 * | 6/2006 | Fiebelkorn | B23B 37/00 451/165 |
| 2006/0248980 A1 | 11/2006 | Mann et al. | |
| 2006/0251480 A1 * | 11/2006 | Mann | B23B 27/045 408/1 R |
| 2007/0066188 A1 * | 3/2007 | Nitta | B24B 1/04 451/41 |
| 2007/0077132 A1 * | 4/2007 | Beckington | B23B 31/02 408/61 |
| 2007/0177953 A1 * | 8/2007 | Matsumura | B23B 31/02 409/136 |
| 2008/0041604 A1 * | 2/2008 | Sauer | B23B 31/02 173/217 |
| 2008/0238255 A1 | 10/2008 | Lee et al. | |
| 2009/0146530 A1 * | 6/2009 | Tang | B23B 31/083 310/323.18 |
| 2010/0158307 A1 * | 6/2010 | Kubota | B23B 29/125 381/400 |
| 2011/0066277 A1 | 3/2011 | Mann et al. | |
| 2011/0155407 A1 * | 6/2011 | Yang | B06B 1/0207 173/217 |
| 2011/0222975 A1 * | 9/2011 | Short | B23B 29/125 408/17 |
| 2012/0107062 A1 * | 5/2012 | Moraru | B23B 29/125 408/17 |
| 2012/0230781 A1 * | 9/2012 | Hoffer | B23C 5/28 407/11 |
| 2013/0028675 A1 * | 1/2013 | Vogler | B23B 29/125 408/1 R |

(56) References Cited

U.S. PATENT DOCUMENTS

2014/0216216 A1 * 8/2014 Hessenkamper ..... B23B 29/125
                                                                    82/1.11

FOREIGN PATENT DOCUMENTS

| DE | 10343682 A1 | 4/2005 | |
|---|---|---|---|
| EP | 0901895 A1 * | 3/1999 | ............... B23Q 1/54 |
| EP | 1669148 A1 * | 6/2006 | ........... B23B 29/125 |
| JP | 1982-56-45336 | 4/1981 | |
| JP | 19957-164217 | 6/1995 | |
| JP | 2002126902 | 5/2002 | |
| JP | 2002346817 A * | 12/2002 | |
| JP | 2006228831 A * | 8/2006 | |
| JP | 2009214286 A * | 9/2009 | |
| JP | 2009241226 A * | 10/2009 | |
| JP | 2011131343 A * | 7/2011 | |
| KR | 20120117156 A * | 10/2012 | |
| WO | WO2003/061886 | 1/2003 | |
| WO | WO2006002675 | 1/2006 | |

* cited by examiner

Section View A-A

Section View B-B

Section View C-C

Section View D-D

ROTATING TOOL HOLDER ASSEMBLY FOR MODULATION ASSISTED MACHINING

CROSS-REFERENCE TO RELATED APPLICATIONS

This application claims the benefit under 35 U.S.C. § 119(e) of U.S. Patent Application No. 61/722,527, entitled "Rotating Tool Holder Assembly for Modulation Assisted Machining," filed Nov. 5, 2012, which is incorporated herein by reference in its entirety.

TECHNICAL FIELD OF THE INVENTION

The present invention relates to machining equipment, and more particularly to machining equipment that employs a rotating tool to perform a function on a workpiece, such as a cutting, drilling or the like.

BACKGROUND OF THE INVENTION

Modulation-Assisted Machining tool holder assemblies and methods for use in machining processes are known in the art and can improve machining performance. An example of a modulation assisted machining tool holder is shown in Mann et al., U.S. Pat. No. 7,587,965—Tool Holder Assembly and Method for Modulation-Assisted Machining. Such a device can also create machined chips with controlled size and shape, as described in Mann et al., U.S. Pat. No. 7,628,099—Machining Method to Controllably Product Chips with Determinable Shapes and Sizes. Modulation-assisted machining systems superimpose a controlled oscillation onto conventional machining processes—for example, turning, boring, drilling, trepanning, parting, or grooving.

The method of modulation-assisted machining creates an intermittent separation (gap) between the tool and the work piece, altering the mechanics of the machining process as described in Mann et al., U.S. Pat. Nos. 7,587,965 and 7,628,099. The modulation can be composed of two principal orientations of oscillation: (1) in the direction of the cutting velocity (velocity-direction modulation) or (2) in the direction of the undeformed chip thickness (feed-direction modulation). Then, the modulation can be effected in either of these principal orientations or in an orientation that is a combination of these principal orientations.

Additionally, the application of appropriate modulation conditions in the principal feed direction has the unique attribute of dividing the removed materials into a series of discrete cutting events, since the undeformed chip thickness reaches a value less than or equal to zero during each cycle of modulation. Application of appropriate modulation conditions in the principal cutting velocity direction causes the instantaneous cutting velocity to become less than or equal to zero.

Regardless of the orientation of modulation, if the modulation conditions are effective, the cutting process is intermittently interrupted during each cycle of the modulation. This interruption can have a number of important benefits for the machining process, including chip control, enhanced effectiveness of cutting fluids, reduced cutting tool wear rates, and reduction in cutting temperatures.

However, the systems and methods described in U.S. Pat. Nos. 7,587,965 and 7,628,099 are effectively limited to a stationary orientation of the tool holder assembly and interconnected components, such that the workpiece rotates while the tool remains stationary. While a stationary tool and rotating workpiece assembly can be useful in some machining situations, certain machining scenarios benefit greatly from an assembly capable of tool rotation during the machining process rather than (or in addition to) workpiece rotation. For example, it is likely far easier to use a rotating tool assembly to perform a drilling operation on a large work piece (e.g. transmission casing) than to rotate a large work piece. These rotating tools are often associated with a computer controlled machining center. A rotating tool poses major design and engineering challenges to provide the proper electrical power and/or control signals to the rotating linear actuator of the modulation tool holder assembly.

Prior art has described possible methods of wireless power using telemetry. See DE10343682 (A1), ASCHENBACH Bernd (author), *Mechatronisches Werkzeugsystem zur Fräs und Bohrungsbearbeitung* [Mechatronic tool system for milling and boring operations.] The prior art has also described other non-contact inductive power methods. See, J. Pi and X. P, Xu, "Design of Integration Tool-Holder System for Ultrasonic Vibration Machining Using Contactless Inductive Power Transfer", *Advanced Materials Research*, Vol. 69-70 (2009) pp 520-524.

However, these methods may not be practical for implementation. Further, these methods may not resolve important aspects of the power signal levels, signal quality, and/or feed-back to the external power source of the computer controls of the parent machine tool itself.

Another difficulty faced in the design and engineering of a rotating tool assembly is dealing effectively with machining environments that often include cutting fluids (e.g., oils) and material contaminants that are used and produced during machining processes.

Thus, difficult design and engineering challenges are posed when trying to create a device that will provide simultaneous rotation to the tool holder assembly, while isolating such power and control systems (including the additional linear actuator used in modulation-assisted machining), from high-pressure cutting fluids during the machining operation. To date, the practical commercial implementation of these alternative methods discussed in Pi and Xu; and in DE20031043682 for control of modulation tool holders has not been realized.

One object of the present invention is to provide a device that addresses these needs.

SUMMARY

The present invention discloses technologies relating to machining equipment, and more particularly to rotating tool holder assemblies used during a machining process.

The industrial application of the inventions described in U.S. Pat. Nos. 7,587,965 and 7,628,099 can be improved by developing a tool holder assembly for modulation that is capable of rotating during modulation. By engineering and implementing new modulation tool holder assemblies, the friction, wear and lubrication of metal cutting and the chip formation process can be controlled in novel ways that are unachievable by existing known machining processes. The present invention provides the ability to prescribe the effective modulation conditions for improved machining processes as described in U.S. Pat. No. 7,587,965 or for the control of chip formation as described in U.S. Pat. No. 7,628,099. Moreover, rotating systems for modulation-assisted machining provide a means to implement the technology across a significantly broader range of industrial machine tools.

Additionally, the present invention discloses a more robust method for supplying electrical power and control signals to/from a rotating "live" modulation tool holder assembly through a rotary electrical connector. A general requirement for modulation tool holder assemblies is the use of electrical wire to commute power and/or various control or monitoring signals to the respective linear actuator of the modulation tool holder assembly. Additional wires may be required to communicate signal or feedback control information between the rotating modulation tool holder assembly and a stationary external power or control system in the machine tool.

Prior known modulation-assisted machining assemblies do not allow for tool rotation as allowed by the present invention. Typically the prior art employs permanent or semi-permanent fixed associated components, such as wire leads that directly connect to the linear actuator. However, in a rotating tool system, such direct connection is not possible without employing novel components for providing electrical contact, such as those described herein.

The present invention discloses a device wherein electrical power is continuously and reliably provided using, for example, a novel electrical contact where liquid mercury is employed to create a contact circuit between a power source connected to a stationary assembly and the rotating spindle of the machine tool. In addition to providing a novel solution to provide power or control signals to and from the modulation tool holder assembly, the rotating electrical connector is very compact in size, has no moving parts, and enables relatively high rotational speeds and longer operating life, in comparison to the contacts in a conventional contact slip ring systems (e.g. copper or graphite brushes).

Along with the electrical power and/or signal control requirements for a rotating modulation tool holder assembly, the assembly must often be capable of delivering high-pressure cutting fluids (e.g., oils and water-based soluble oils) to cutting tools (e.g., drills) installed in the modulation tool holder assembly. The present invention addresses this need through the use of a highly inventive rotating union, comprised of a rotating section and a stationary section. High-pressure cutting fluid (e.g., oil, air, or aqueous-based fluids) can be supplied through a connector on the stationary section of the hydraulic union.

Additionally, the present invention introduces a rotary hydraulic coupling assembly that enables the rotating hollow wiring shaft from the modulation device to pass directly through the axis of the stationary section of the rotary union supplying the high-pressure fluid.

In some implementations, this special configuration utilizes a linear bearing sleeve (such as a bronze bearing or miniature roller bearing) installed into the rotary coupling to maintain the centric position of the shaft while supporting the rotary motion. In such implementations, the sleeve is simultaneously coupled with one or more rotary shaft seals that prevent fluid leakage.

Thus, the present invention provides for simultaneous rotation of a tool holder assembly in modulation-assisted machining, while also providing power and control wires through the rotating assembly and providing high-pressure cutting fluid through the assembly in a manner that protects and isolates the modulation components—for example, the power and control wires and the linear actuator—during the machining process.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
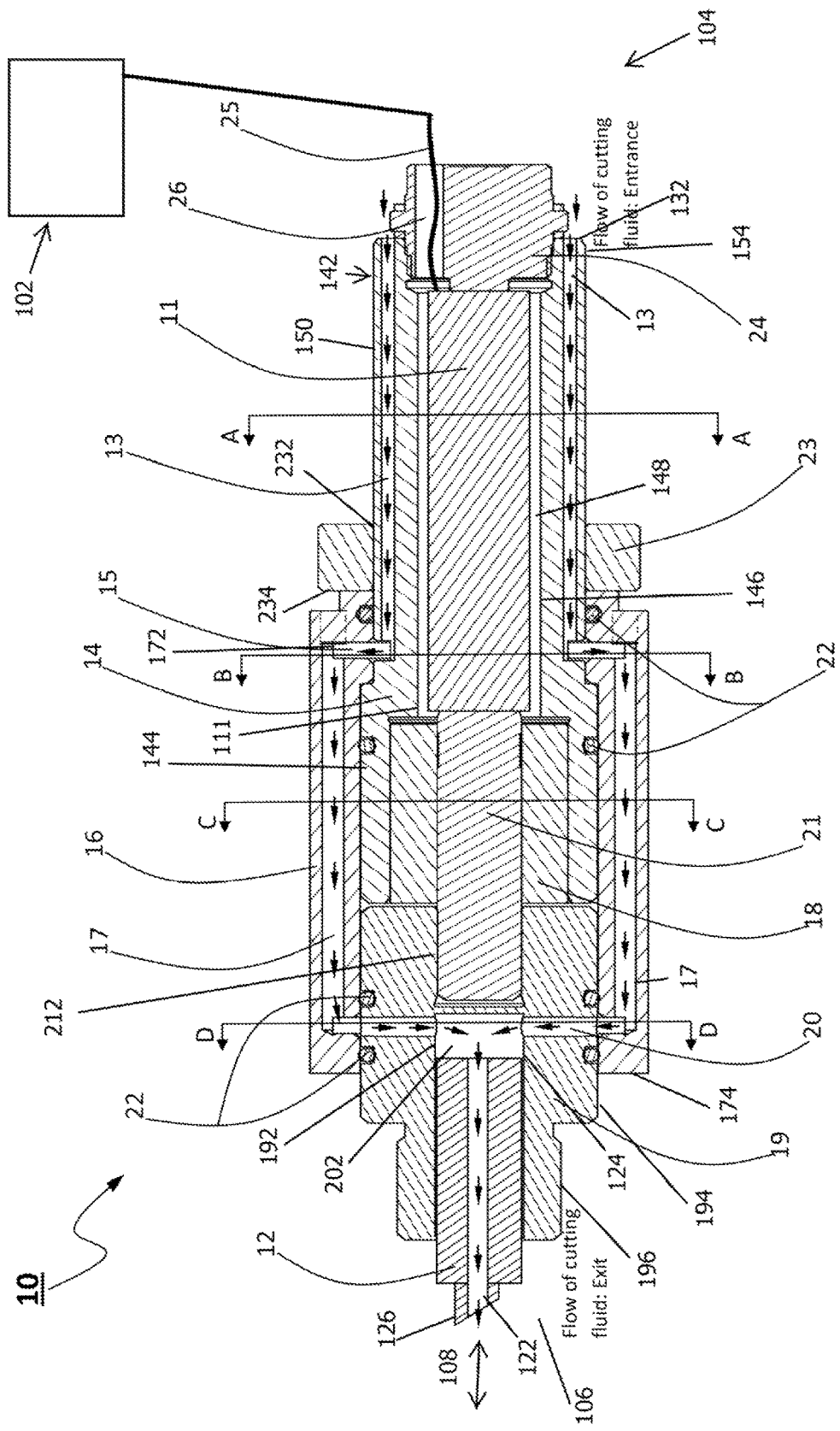
FIG. 1(a) is a sectional view of the present invention illustrating the components of the "live" rotating modulation tool holder assembly that enable both the electrical power and the high-pressure fluid to be transferred to the rotating, "live" modulation tool holder assembly.

Before the present methods, implementations, and systems are disclosed and described, it is to be understood that this invention is not limited to specific synthetic methods, specific components, embodiments, particular compositions, dimensions, and as such, may vary. It is also to be understood that the terminology used herein is chosen and employed for the purpose of describing particular implementations only and is not intended to be limiting.

As used in the specification and the claims, the singular forms "a," "an" and "the" include plural components unless the context clearly dictates otherwise. Ranges may be expressed in ways including from "about" one particular value, and/or to "about" another particular value. When such a range is expressed, another implementation may include from the one particular value and/or to the other particular value.

Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance often though may not occur, and that the description includes instances where said event or circumstance occurs and instances where it does not.

As will be discussed below, the present invention is a rotating tool holder assembly to be used in Modulation-Assisted Machining. The present invention improves upon the devices and methods disclosed in U.S. Pat. Nos. 7,587,965 and 7,628,099, which are incorporated by reference.

The linear actuator 11 in a modulation tool holder assembly 10 is controlled by power and/or control signals transmitted from an external power source or control system 102. In conventional machining processes, the material removal is accomplished by cutting tools held by a (non-modulating) tool holder assembly installed into the machine tool spindle or tool block (e.g., milling machine or lathe). In conventional machining, the cutting process is relatively continuous. In modulation-assisted machining, the application of a controlled, low-frequency sinusoidal oscillation (i.e., modulation, typically <1000 cycles per second to the tool or workpiece) divides the otherwise continuous cutting process into a series of discrete cutting events wherein the tool engages with and disengages from the work piece.

These discrete cutting events alter the mechanics of the machining process and offer unique benefits for the machining process, including the control of chip formation and improved tool wear. The modulation tool holder assembly 11 may be stationary in a lathe machine (i.e., non-rotating, as described in U.S. Pat. No. 7,587,965). In the present invention, the tool holder assembly can be designed to rotate when installed in the spindle of a machining center or other rotating system.

The modulation tool holder assembly of the present invention is designed for use with actuators such as piezoelectric actuators, magnetostrictive actuators, or linear motors such as described in U.S. Pat. Nos. 7,587,965 and 7,628,099 for enabling the tool to move in a cyclic, linear manner. Such linear actuations require that electric power and/or control signals be supplied to the linear actuator simultaneously with the rotational action to enable the tool both to rotate and to move linearly. Machining processes that employ rotating tools are commonly referred to as "live" machining operations.

The tool holder is typically rotated in a spindle while it is simultaneously fed into or traversed through a work piece causing the removal of material from the work piece by the tool. Examples of tools employed in machining processes include drills, reamers, boring tools, threading tools, milling tools, grinding tools, or broaching tools. The rotating tools remove material from a work piece which itself may be stationary or simultaneously moving (e.g., rotating or translating).

In these complex machining systems, the implementation of modulation assisted machining may be accomplished using a tool holder assembly for modulation that is adapted to and/or integrated into a rotating spindle of the machine tool.

A tool holder assembly 10 of the present invention is represented in FIG. 1(a), that discloses the "live" rotating modulation tool holder assembly 10 of the present invention. Tool holder assembly 10 includes a proximal or machine engaging end 104 and a distal, or tool engaging end 106. The machine engaging end 104 is typically engaged to the machine (not shown) that operates the tool holder assembly 10. The tool engaging end 106 is provided for engaging a tool 12 that engages a work piece (not shown) wherein the tool 12 performs an operation on the work piece. The tool holder assembly 10 also includes a major axis 108 that extends between the machine engaging proximal end 104 and the tool engaging distal end 106 and serves as the axis of rotation for the rotating components of the tool holder assembly 10.

The tool holder assembly 10 is a rotating or "live" modulation tool holding assembly that permits both power and fluid to be transferred with the tool assembly 110 from the proximal or machine end 104 to the distal or tool engaging end 106. In the modulation tool assembly 10 of FIG. 1, the components are sized and configured to permit high-pressure fluid to pass through the tool holder assembly 10 from the proximal end 104 to the distal end, while causing the fluid to remain spatially separated from the linear actuator 11. The path of the fluid in the tool holder assembly 10 is denoted by arrows running from the proximal end 104 to the distal end 106.

As will be described in more detail below, the tool holder assembly 10 includes a series of passageways, including the annular array of axially extending passageways 13 that are formed in the body 14, annular washer shaped, radially extending ring grooves 15, an annular array of axially extending sleeve passageways 17 that are formed as a part of sleeve 16, radially inwardly extending portholes 20, the proximal end of tool 12 receiving cavity 202 and the axially extending central passageway 122 that extends between the proximal end 124 and the distal, or work piece engaging end 126 of tool 12. As will be noted, the passageways 13, 15, 17, 20, 202, 122 route the fluid through spaces relatively close to the radially outwardly facing exterior surface of the tool holder assembly 10, so as to minimize any interaction between the fluid and the linear actuator 11.

The passageway 122 through the longitudinal axis 100 of the cutting tool 12 provides high-pressure fluid (e.g., cutting fluid) to the surface of the work piece being cut. This cutting fluid helps to lubricate the cutting operation, keep the work piece and tool 12 cool, and helps to flush dislodged cutting debris away from the surface of the work piece.

Often, these high-pressure fluids have pressures of between about 20 and 300 bar. Examples of cutting fluids include liquids (e.g., oil-based, kerosene, alcohol, compressed gases, etc.), pastes/gels (e.g., fatty alcohols, wax, etc.), aerosols/mists, and/or gases (e.g., carbon dioxide, nitrogen, oxygen, etc.).

A tool holder nose 19 is used to mechanically connect and/or affix the appropriate cutting tool 12. A variety of toll holder noses 19 exist and include such things as collets, chucking devices, tool clamping devices, etc. As shown in the drawing, the tool nose 19 includes an axially extending, radially inwardly facing wall 192 that defines an interior passageway that includes cavity 202. The radially inwardly facing cylindrical wall 192 is sized and configured for engaging an axially extending, radially outwardly facing wall of the tool 12, and snugly engaging said tool 12 so that rotation of the tool nose 19 causes rotation of the tool 12. The proximal end of the tool 12 and the axial extending passageway of the tool nose 19 define passageway 202, that collects the high pressure fluid and directs the high pressure fluid axially distally out the axially extending passageway 122 of tool 12.

The nose 19 also includes a radially outwardly facing, axially extending surface having a relatively enlarged diameter proximal portion 194 and a relatively reduced diameter distal portion 196. The proximal portion surface 194 includes a pair of annular, radially circumferential channels for receiving O-rings 22 to help prevent fluid leakage out of radially extending port holes 20.

The radially outwardly facing surface 194 is sized and configured for receiving the radially inwardly facing surface of sleeve 16 in a fluid tight arrangement.

The body 14 includes a relatively reduced diameter proximal portion 142, and a relatively enlarged diameter distal portion 144. The proximal portion 142 of the body 14 comprises a thickened tube having an axially extending, radially inwardly facing surface 146 that defines an interior passageway (interior surface) 148 that is sized and configured for receiving the linear actuator 11 therein.

The radially outwardly facing surface 150 is generally cylindrical in configuration and is sized and configured for being received by the radially inwardly facing surface 232 of step 23. The radially extending, proximal end surface 154 includes an annular array of ports 132 that comprise the upstream opening of axially extending, fluid containing body passageways 13. The passageways 13 extend within the interior of the body 14, between the radially inwardly facing surface 146, and the radially outwardly facing surface 150. The passageways extend throughout substantially the entire length of the proximal portion 142 of the body 14.

The distal ends of the body passageways 13 terminate at the ring groove 15 that essentially comprises an annular trough formed in the radially extending proximal surface of sleeve 16. Ring groove 15 provides a channel for permitting fluid exiting from the distal end of passageway 13 to flow radially outwardly into the proximal ends 172 of sleeve 16 passageway 17.

As an alternative to the annular array of passageways 13, other embodiment may employ for example, a single layer, multiple passageway or a pair of semi-annular space sufficient to provide passage for fluids. As depicted, these passageways 13 terminate distally at the annular ring groove 15 formed in the radially extending proximal surface 154 of the body.

Alternatively, other types of passageway 13 and groove 15 configurations may be useable.

One wall of the annular ring groove 15 is provided by a radially extending axially distal facing surface of sleeve 16. The annular ring groove 15 receives fluid from passageways 13 to create a fluid manifold. As depicted, the outer sleeve 16 includes a series of axial extending passageways 17 disposed generally parallel to the major axis 108 of the sleeve 16. The placement of fluid passageways 17 in sleeve 16 enables the high-pressure fluid to pass radially outwardly of and not through or in contact with outside the rotary ball-spline bearing assembly 18.

As depicted, the sleeve 16 is disposed radially outwardly of the tool nose 19. A radially inwardly facing surface of the sleeve 16 is sized and configured, at the distal end 174 of sleeve 16, to sealingly engage the radially outwardly facing surface of the proximal portion 194 of tool nose 19. A pair of O-rings 22 prevent the flow of fluid between the tool nose 17 and the sleeve 16.

The proximal end 164 of sleeve 16 has a radially extending, axially proximally facing surface that abuts against a radially extending, axially distally facing surface 234 of circular stop ring 23. The proximal end 164 of sleeve 16 also includes an axially extending, radially inwardly facing surface that engages the radially outwardly facing surface 150 of body 14.

The distal end 174 of the sleeve is disposed radially outwardly of the tool nose 19. The downstream end 176 of the passageway 17 terminates at radially extending passageways 20 that are formed in the enlarged diameter portion 194 of the tool noose 19. The radial extending passageways 20 conduct the fluid radially inwardly toward the central, axially extending passageway 202 of the tool nose 19 which houses axial tool 12. Fluid in the upstream cavity of the axial extending passageway 202 is then directed to the axially extending central fluid passageway 122 formed in the tool 12, and ultimately discharged out the distal end of tool 12 to impact the cutting surface of the work piece (not shown) upon which the tool 12 is performing an operation.

As depicted, the annular ring groove 15 can align with two or more radially extending port holes 20 in the tool holder nose. The radially inwardly facing surface of the proximal portion 194 of the tool holder nose 19 is rigidly connected to the radially outwardly facing surface 212 of ball-spline shaft 21. The ball-spline shaft is disposed coaxially with and distally of the linear actuator 11. The radially extending, axially proximally facing surface of the ball spline shaft 21 engages and is placed next to a radially extending, axially distally facing surface 111 of the linear actuator 11. This end engagement permits the linear actuator 11 to axially move the ball spline shaft 21.

In some implementations, the junctions between the radially outwardly facing surface of the tool holder body 14, the radially inwardly facing surface of outer sleeve 16, and the radially outwardly facing surface of the tool nose 12 are sealed using O-rings 22.

The radially inwardly facing surface 232 of a circular stop ring 23 is rigidly clamped to the radially outwardly facing surface 150 of tool holder body 14 to prevent axial movement of the outer housing and thereby fixedly axially position the outer body. The proximal end of linear actuator 11 is rigidly connected to the distal end tail cap 24. The tail cap 24 also serves to seal the linear actuator 11 from fluid intrusion.

In some implementations, this connection between tail cap 24 and linear actuator 11 can be removable, nonrigid, flexible, and or intermittent. For example, the linear actuator 11 can be semi-rigidly or flexibly connected to the tail cap 24 through the use of a rubber boot enclosure. Electrical power and/or signal control wires 25 from an external source 102 connect to the linear actuator 11 by passing through an axially extending off-axis hole 26 located in the tail-cap 24.

Figure 1B:
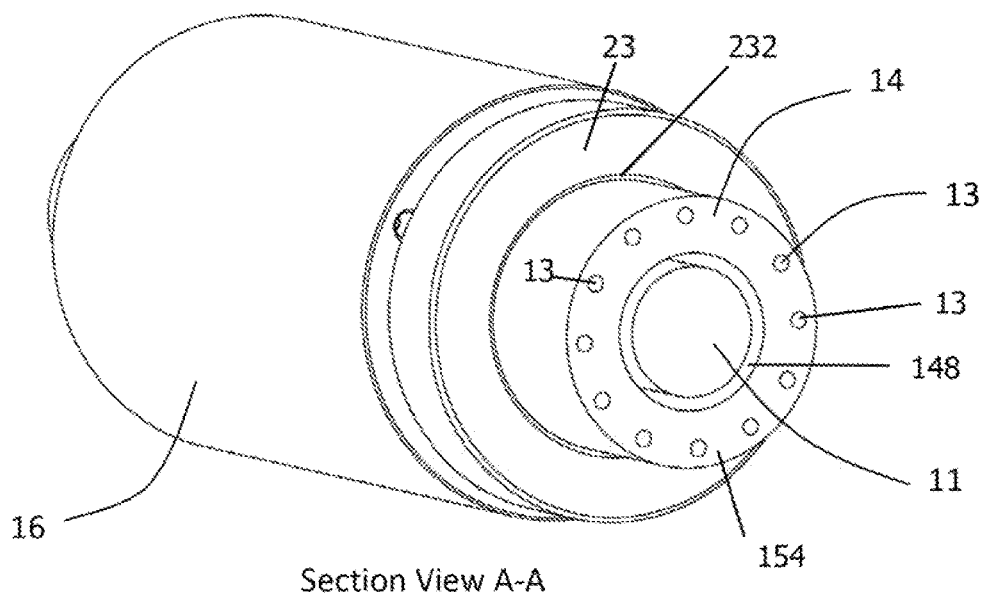
FIG. 1(b) is a sectional view along lines A-A of FIG. 1(a).

FIG. 1(b) shows a cross-sectional view of the portion depicted in FIG. 1(a) cut along lines A-A. This view depicts the centrally located linear actuator 11 that is received within, and is encircled by the generally cylindrically tubular body 14. The body 14, as depicted, has an annular array of axially extending, parallel passageways 13 that extend longitudinally through the body 14. Other configurations may also be used for the passageways 13. The outer sleeve 16 includes an axially extending, central passageway 17 (FIG. 1a) for interiorly receiving the distal portion of the body 14. The slip ring 23 shown includes a central passageway that is defined by radially inwardly facing surface 232 for interiorly receiving the body 14. The slip ring 23 is disposed relatively proximally of, and coaxially with the sleeve 16.

Figure 1C:
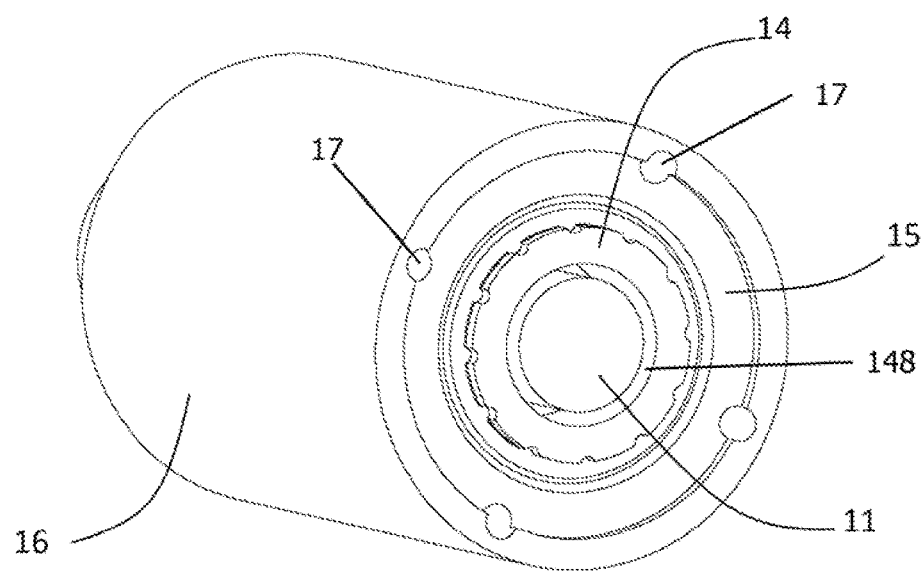
FIG. 1(c) is a sectional view taken along lines B-B of FIG. 1(a).

FIG. 1(c) shows a cross-sectional view taken along lines B-B in FIG. 1(a). This view again depicts the centrally located linear actuator 11 being interiorly received by the central passageway 148 of the body 14. One should note the cylindrical space 48 between the radially outwardly facing surface of the linear actuator 11 and the radially inwardly facing surface of the body 14.

The axial passageways 13 of body 14 are not shown due to an axial position of lines B-B, which lines are positioned distally of the distal terminus of passageway 13. Rather, lines B-B are positioned to extend through the annular ring groove 15. This annular ring groove 15 controls fluid radially outwardly from the distal or downstream terminus of passageways 13 to the upstream end of sleeve passageway 17, which also comprises a series of annularly disposed, axially extending passageways 17 in the outer sleeve 16.

Alternately, this annular ring groove 15 can take the form of a series of holes or grooves. In some other implementations, the series of annular holes 17 in the outer sleeve 16 can take other forms, such as large semi-cylindrical or quarter-cylindrical spaces.

Figure 1D:
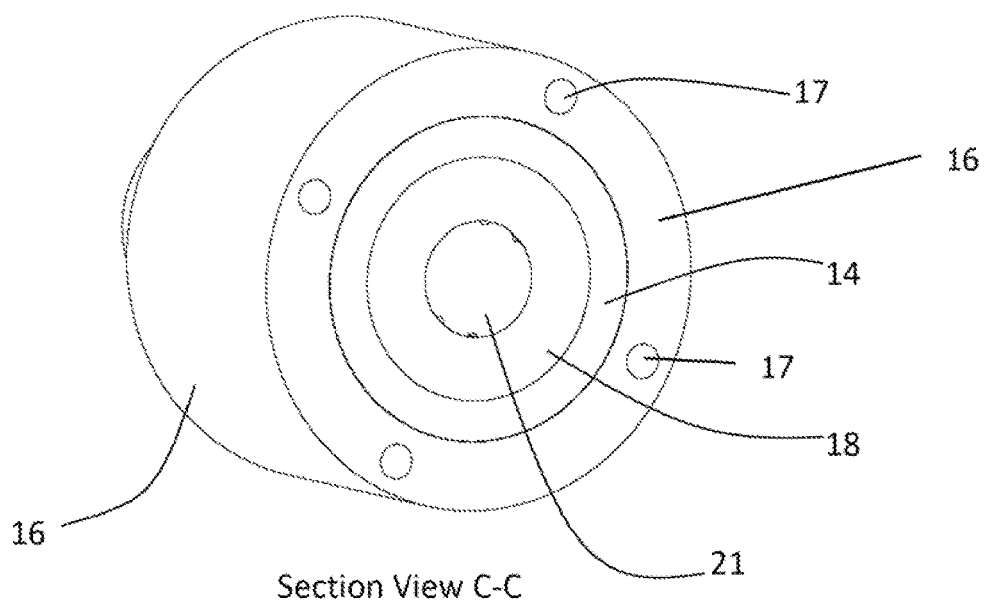
FIG. 1(d) is a sectional view taken along lines C-C of FIG. 1(a).

FIG. 1(d) shows a cross-sectional view taken along lines C-C of FIG. 1(a). The ball spline shaft 21 is centrally located within the device such that the axis A of the device passes through the axis of the shaft 21. The ball-spline shaft 21 is interiorly received with the rotary ball-spline bearing assembly 18. The rotary ball-spline bearing assembly 18 is interiorly received with a central passageway of the proximal portion of the body 14. The body 14 is itself interiorly received within the outer sleeve 16.

FIG. 1(d) shows the annular array of longitudinally extending passageways 17 of outer sleeve 16 that act as passageways for the high-pressure cutting fluid. These passageways 17 have their upstream terminus at radial passageway 172, and their downstream terminus at radial passageway 20.

Figure 1E:
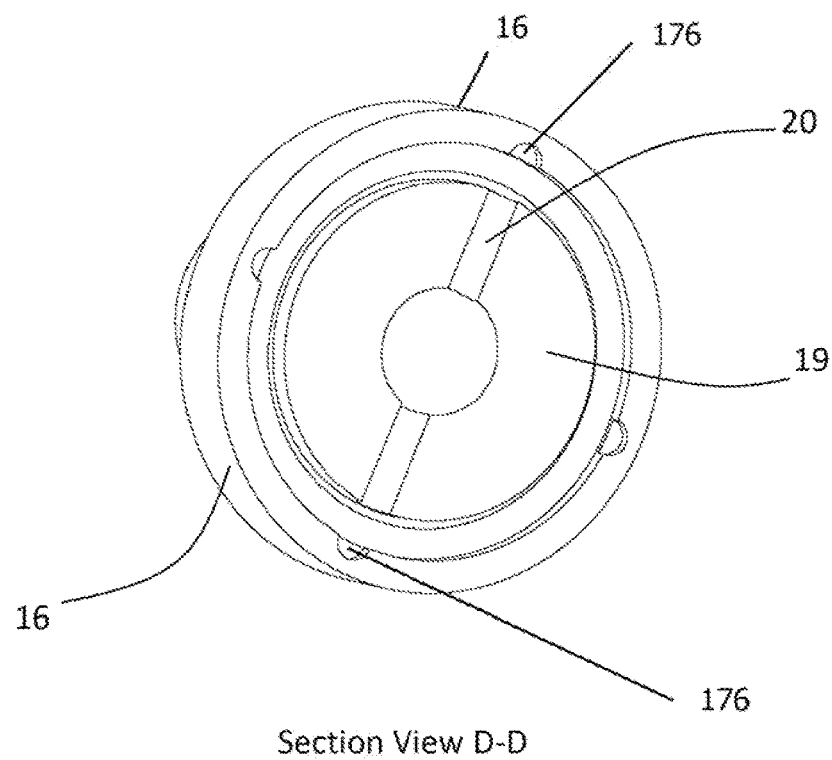
FIG. 1(e) is a sectional view taken along lines D-D of FIG. 1(a).

FIG. 1(e) is a cross-sectional view taken along lines D-D of FIG. 1(a). FIG. 1(e) shows the tool holder nose 19 while interiorly received by and disposed coaxially with sleeve 16 that extends along part of the proximal portion 194 of the tool nose 19.

A pair of radially extending port hole passageways 20 fluidly couple the downstream terminus of passageways 17 with that portion of the tool receiving cavity 202 of the tool nose 19 that is disposed proximally and upstream of tool 12 and the axially extending fluid passageway 122 of cutting tool 12. As shown in FIG. 1(a), the cutting tool 12 is then inserted into the central passageway 202 of the tool nose holder 19. Thus, high-pressure fluid travels from the annular array of passageways 17 in the outer sleeve 16, through the radially extending passageways 20 in the tool holder nose 19, and finally axially distally through the central passageway 122 of cutting tool 12 and then onto the cutting surface of the work piece.

Figure 1F:
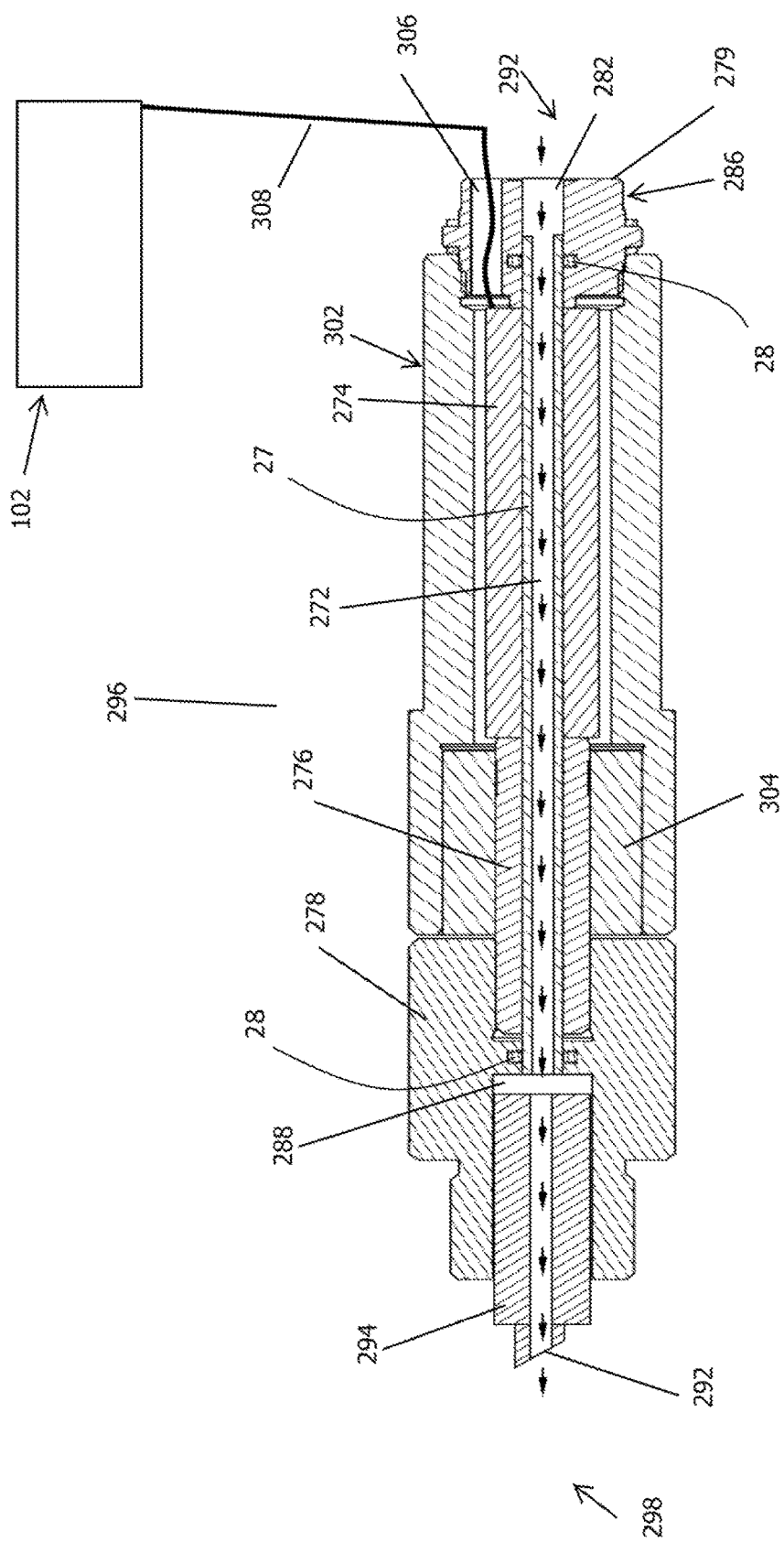
FIG. 1(f) shows an alternate embodiment of the present invention wherein cutting fluid passes directly to the cutting tool through a centrally disposed axial passageway in the linear actuator.

FIG. 1(f) depicts an alternate embodiment of the present invention wherein high-pressure fluid circulates directly through a central passageway 272 defined by a sleeve 27 that extends through a central axially extending passageway formed in the linear actuator 274 and spline shaft 276 and tool nose 278. The fluid can flow from its upstream terminus 282 at the proximal end 279 of the tail cap 286, through the passageway portion within the linear actuator 274. Fluid then continues to flow axially distally in the passageway through the spline shaft 276, through the passageway 272 portion within the tool nose 278 and into the cavity that comprises the upstream (proximal) end of the central axially extending tool receiving passageway 288 of the tool nose 278. The fluid then continues its axial and distal flow path through the central passageway 292 of the tool 294.

This path differs from the fluid path shown in FIGS. 1(a)-1(e) where the fluid flow path directs the cutting fluid radially outwardly of, and spatially separated from the linear actuator 11.

The path of the fluid flow in FIG. 1(f) is depicted as block arrows running distally from the proximal end 294 of the tool assembly 296 to the distal end 298 of the tool assembly 296. Tool 296 also includes a body portion 302, a bearing assembly 301, and an off axis passageway 306 for receiving power/control cable 308.

This embodiment of FIG. 1(f) would not need to make use of the outer sleeve 16 to isolate the high-pressure fluid around the linear actuator 11 as the fluid instead travels directly through an axial, central passageway 272 created in the linear actuator 274. The fluid in this passageway 272 is isolated from the linear actuator 274 by sleeve 27, thus preventing contamination or degradation of the linear actuator 274. One such means of isolation is the use of the hollow tubular sleeve 27 and O-rings 28 to seal the fluid inside the tube 27 and linear actuator 274.

Another alternate embodiment isolation means involves coating the passageway of the linear actuator 274 with an inert resilient coating or membrane. Alternatively, an embodiment might comprise the use of a series of several small actuators (not shown), controlled in unison and forming a ring around a hollow tube 27 instead of using a single actuator (e.g. 274).

Figure 2:
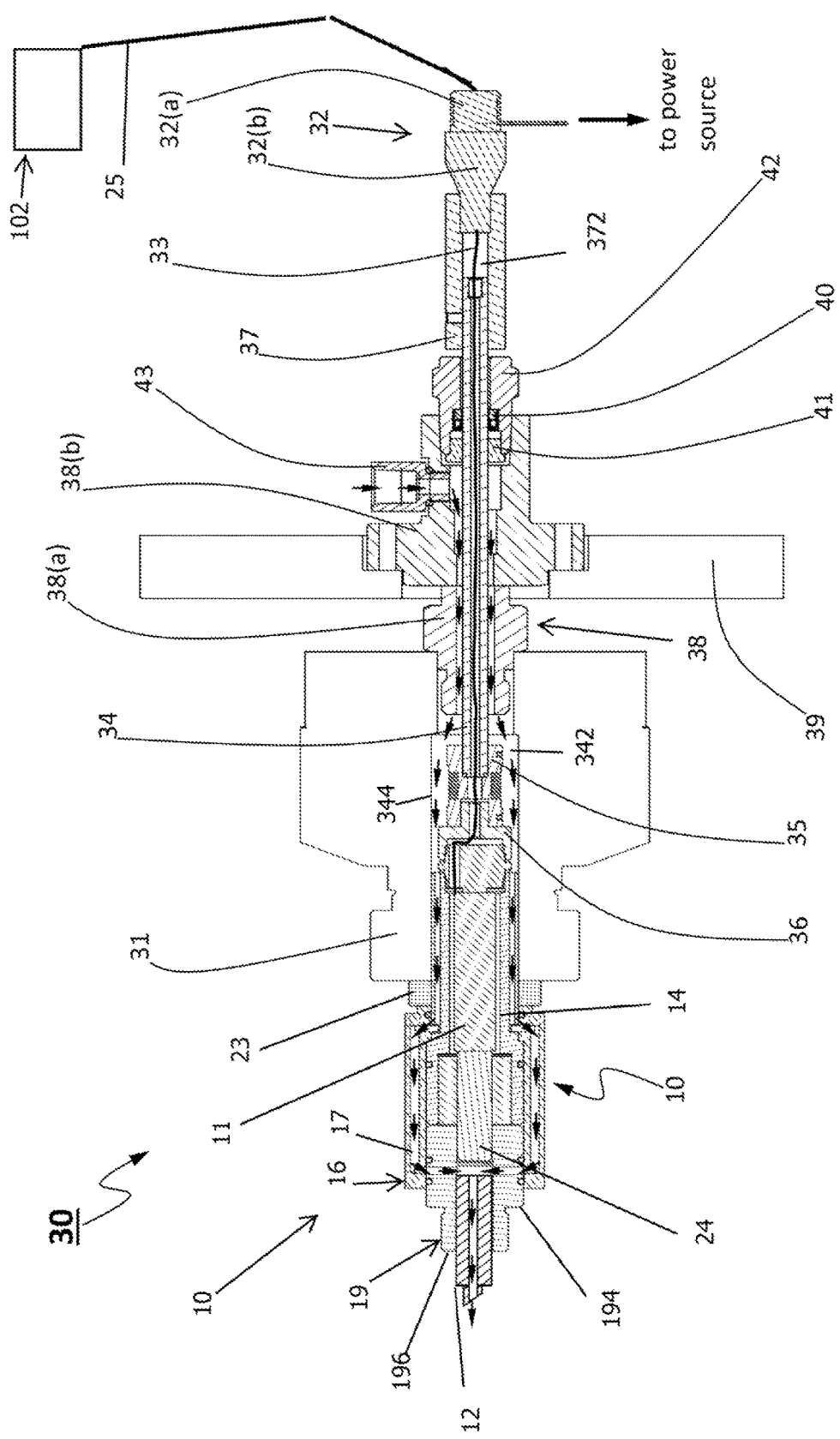
FIG. 2 is a side sectional view of a rotating modulation tool holder assembly installed in a dedicated spindle configuration wherein the rotating modulation tool holder assembly is generally permanently installed in the rotating spindle, except for removal for occasional maintenance or repairs.

FIG. 2 shows the rotating modulation tool holder assembly 10 installed in a fixed spindle configuration 30 where the rotating modulation tool holder assembly 10 is permanently installed in the rotating spindle 31. The path of the fluid is shown as block arrows that commence as the fluid flows radially inwardly through fluid receiving port 43, and then axially distally through an axially extending passageway in the stationary section 38(b) and rotating section 38(a) of rotary hydraulic coupling 38.

The fluid then continues in its axially distal path through cavity 342 which is defined by the radially inwardly facing interior wall 344. Passageway cavity 342 is also defined by the radially outwardly facing wall of insulated coupling 35 and flexible end cap adapter 36. The fluid then continues to flow axially distally into the annular array of longitudinally extending passageways 13 that are formed in body 14.

A rotary electrical connector 32 having a rotating male plug member 32(a) and a stationary female plug member 32(b) enables power and/or signal wires 25 from a stationary external source 102 to connect to mating wires 33 leading to the modulation tool holder assembly 10 through a cylindrical shaft 34 that extends through the axially extending central passageway of insulated coupling 37, retainer 42, linear bearing 41, rotary coupling 38 and which terminates at its distal end in the insulated coupling 35. The rotary electrical connector 32(a), 32(b) consists of a conductive male rotating section 32(a) and a conductive female stationary section 32(b).

The rotating section 32(a) is affixed to the stationary section 32(b). The stationary member 32 (b) is fixedly coupled to the proximal end of cylindrical insulated coupling 37. The insulated coupling 37 includes an axially extending interior passageway whose distal end is sized and configured for receiving the proximal end of cylindrical shaft 34. Cable 33 passes through the interior passageway 372 of insulated coupling 37. The stationary section 32(b) of the rotary electrical connector 32 is connected to the external power and/or control source 102 by cable 25.

The electrical power and/or control wires 33 pass through the passageway of the cylindrical shaft 34 that is connected to the insulated coupling 35 that is coupled to the rotating modulation tool holder assembly 10. Flexible insulated coupling 35 is coaxially coupled to a tail-cap adapter 36. The rotary electrical connector 32(a), 32(b) is adapted to be coupled to the end of the hollow shaft 34 using an insulated coupling 37.

High-pressure fluid can be passed through the modulation tool holder assembly 10 to the cutting tool 12. A rotary hydraulic coupling assembly 38, that includes a rotating section 38(*a*) and stationary section 38(*b*) provides a vehicle for coupling the stationary portion of the device 30 (that includes those components at and proximal of stationary frame 39, with the rotating portion of tool 10, that includes rotating coupling 38(*a*) and components distal thereof. The rotating section 38(*a*) of the rotary hydraulic coupling 38 is connected directly to the distal end of the axially extending passageway 312 of rotating machine spindle 31. The stationary section 38(*b*) of the rotary hydraulic coupling 38 can be connected directly to the stationary frame 39 of the machine tool.

The hollow cylindrical shaft 34 is sealed in the rotary hydraulic coupling 38 using a shaft seal 40. A linear bearing 41 is disposed distally of the shaft seal 40 and supports the hollow shaft 34. The shaft seal 40 and linear bearing 41 are pressed centrically into the axially extending central bore of the retainer 42. High-pressure fluid is supplied to axially extending passageway 386 of the rotary hydraulic coupling assembly 38 through, the port connector 43.

Figure 3A:
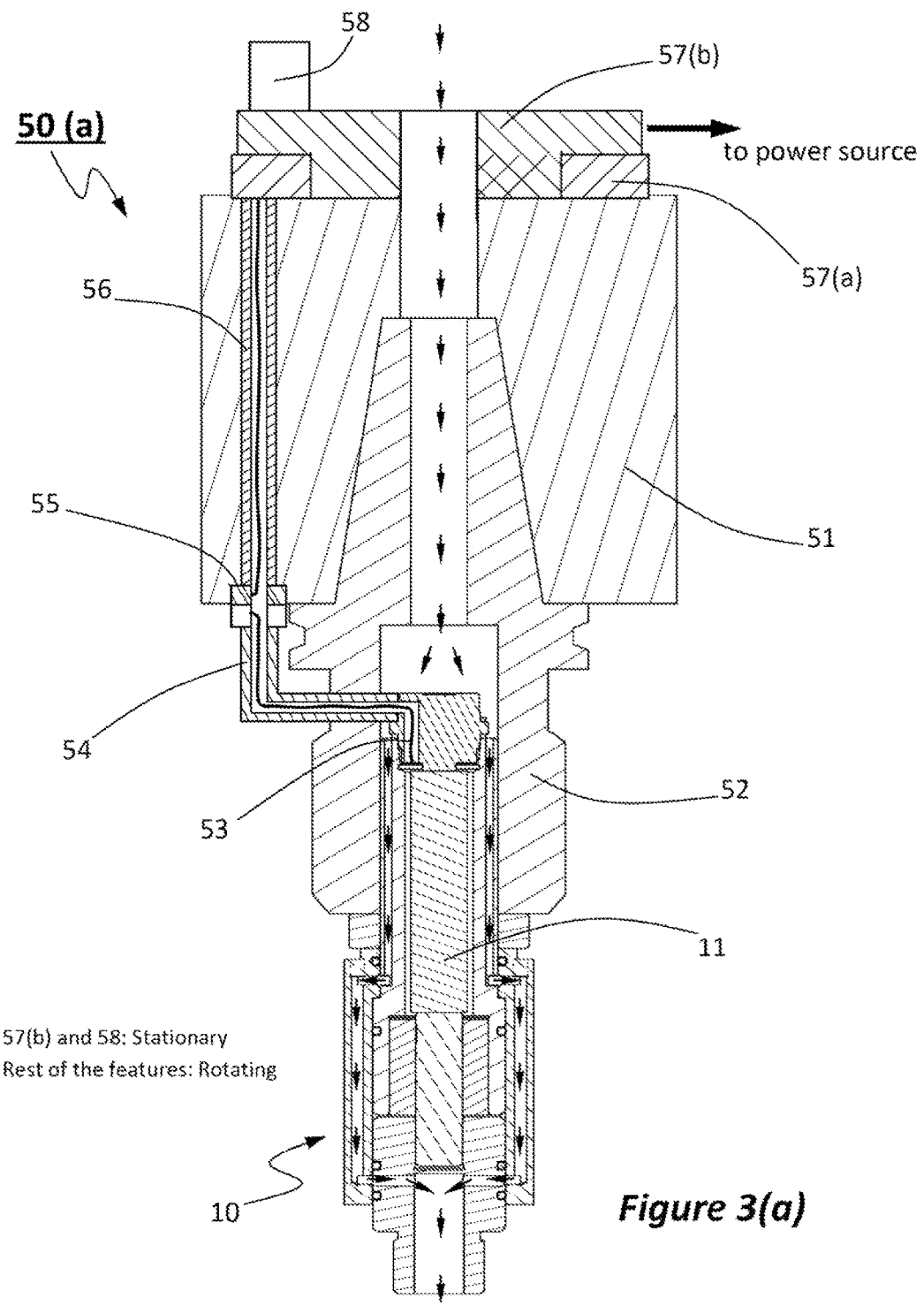
FIG. 3a shows one example of modulation tool holder assembly installation where the cutting tools are intermittently exchanged into the machine spindle and the modulation tool holder assembly can be exchanged in and out of the machine by a manual operation or an automatic operation.
Figure 3B:
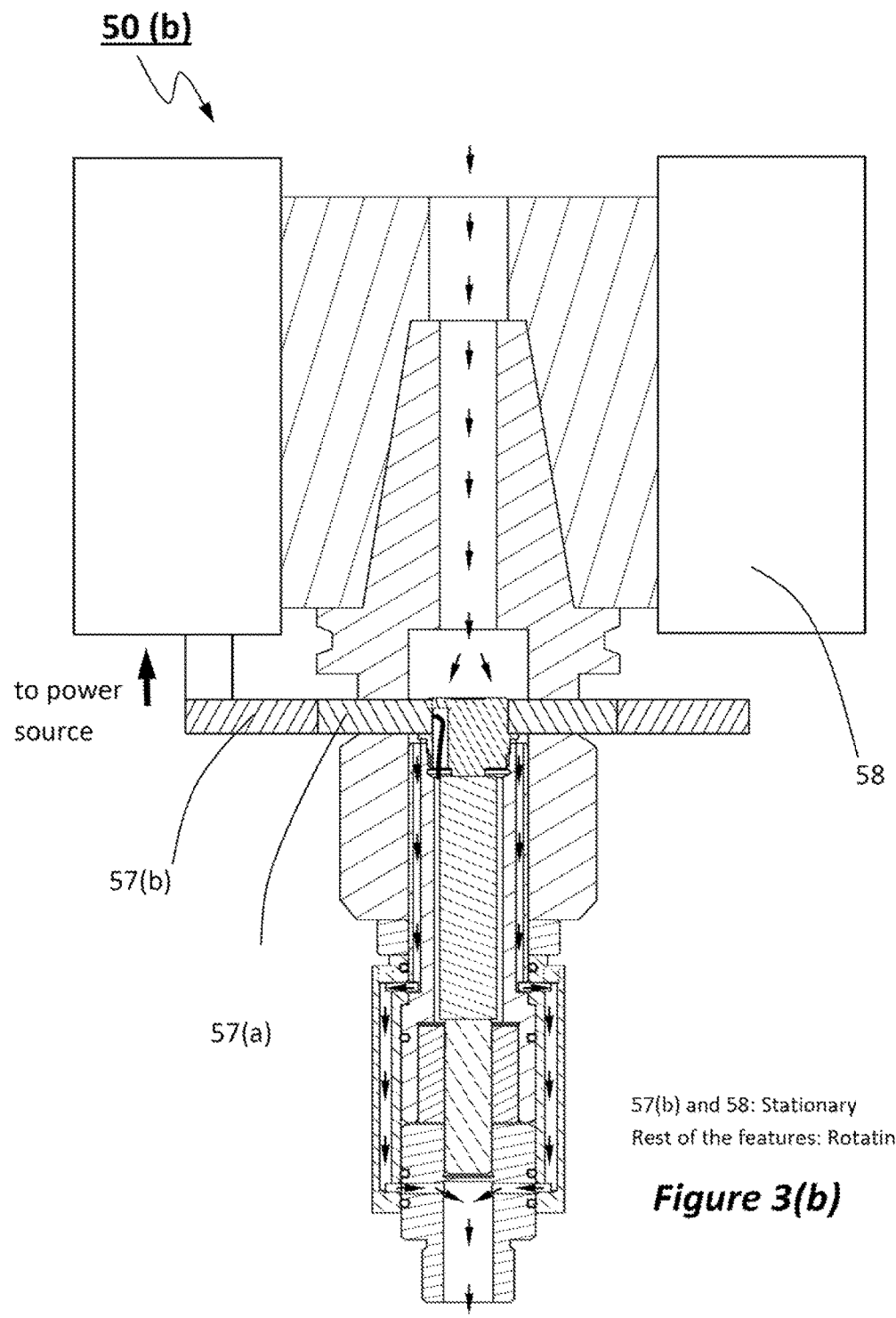
FIG. 3b shows another example of modulation tool holder assembly installation where the cutting tools are intermittently exchanged into the machine spindle and the modulation tool holder can be exchanged in and out of the machine.

FIG. 3(*a*) and FIG. 3(*b*) show examples of modulation tool holder assembly installations 50(*a*) (FIG. 3(*a*)), 50(*b*) (FIG. 3(*b*)) where the cutting tools 12 are intermittently exchanged into a tool assembly holder such as a machine spindle 51, and the modulation tool holder assembly 10 can be exchanged in and out of the machine. In these configurations the modulation tool holder assembly 10 can be removed and reinserted into the machine spindle 51 by installing the modulation tool holder assembly 10 into the axially extending central passageway 522 of a tool receiver or adapter 52.

Additionally, in the embodiments of FIGS. 3(*a*) and 3(*b*) high-pressure fluid is circulated through a central passageway in 522 in tool receiver 52, that is aligned with, and coaxial with an axially extending passageway 512 in machine spindle 51. Machine spindle 51 has an axially extending central passageway 512 that is coaxially aligned with, and disposed distally of the stationary section 57(*b*) of rotary electrical connector 57. The passageway 522 of adapter 52 includes a relatively reduced diameter proximal portion 524 and a relatively enlarged diameter distal portion 526.

The distal portion 526 has a diameter sized for receiving the proximal end components, such as body 14, and end cap 24 of the machine tool holder 10.

The path of the fluid is depicted as block arrows running from the proximal end 514 of passageway 514 to the distal end 206 of passageway 202 of tool nose 19. In the embodiment shown, the electrical conductors, (such as wires 53 for power and/or control signals) connect to the linear actuator 11 of the modulation tool holder assembly 10 through the tool receiver or adapter 52 to a secondary electrical connector 54. The secondary electrical connector 54 engages a primary electrical connector 55 mounted to the rotating machine spindle 51.

The rotating machine spindle 51 includes an axially extending, off axis passage 56 through which wires 562 can be extended from the primary electrical connector 55 to the rotating section 57(*a*) of a rotary electrical connector or slip ring 57 located proximally of and coaxially with the proximal end 516 of the rotating machine spindle 51. The rotary electrical connector 57 includes a rotating section 57(*a*) and a stationary section 57(*b*). Stationary section 57(*b*) includes fluid passageways 512 for enabling fluid to pass from the area or fluid conduit disposed proximally of stationary section 57(*b*) to the proximal portion 524 of the axially extending central passageway 527. The stationary section 57(*b*) receives power and signals from an external power and/or control source 102.

The rotating section 57(*a*) of the rotary electrical connector 57 is rigidly connected (e.g., clamped) directly onto the proximal end 516 of the machine spindle 51. In an alternate embodiment, this connection between the electrical connector 57(*a*) and spindle 51 can be flexible instead of rigid. For example, the rotating section 57(*a*) can be installed into a rubber, plastic, or otherwise non-rigid fixture connected to the proximal end of the machine spindle 51. The stationary section 57(*b*) of the rotary electrical connector 57 is engaged by a rotation preventing anti-rotation fixture 58 held rigidly in the machine.

The power and signal wires 53 can pass from the external power and control source 102 through the fixed housing (not shown) to the stationary section 57(*b*) of the rotary electrical connector 57. Alternatively, for example in FIG. 3(*a*), the wires 53 from the linear actuator 11 can pass through the adapter directly to a rotary electrical connector or slip ring 57 mounted onto the distal end 516 tool adapter 52.

As used in the above implementations examples, commercial rotary slip rings can accommodate a wide range of operation. However, in some cases, the available working space for integration in the machine tool may limit their implementation. An alternative to slip rings is the use of a small, liquid metal filled rotating electrical connector 348 (e.g., Mercotac®, Inc.) that can be coupled directly to the end of a hollow shaft 34 connected to the modulation tool holder assembly 10 providing a conduit for the electrical power and or signal control to the linear actuator 11 of the modulation tool holder assembly 10 (FIG. 2).

The hollow cylindrical shaft 34 may be connected to the rotating TriboMAM® assembly using a flexible motor coupling 36 to reduce angular or concentric misalignment over the length of the assembly. This enables the hollow shaft 34 to rotate simultaneously with the modulation tool holder assembly 10 that is held in the machine spindle 51 (e.g., collet, chucking device, tool clamping device, etc.).

The hollow shaft 34 can pass axially through the axially extending central passageway 344 of the rotating spindle 31 that the modulation tool holder assembly 10 in the machine tool. The electrical power and/or signal wires 25 leading from the modulation device's linear actuator 11 can be routed through the hollow shaft 34 and connect to a rotating electrical connector 32(*a*), which is then mounted directly to the end of the hollow shaft 34 opposite from the modulation tool holder assembly 10.

The rotating electrical connector 32(*a*) can be a single channel or multi-channel contactor design. The rotating electrical connector 32(*a*) enables electrical power to be passed directly from a stationary power source—such as a power supply or controller 102 to the modulation tool holder assembly 10. Wires for electrical power and/or control signals 25 can alternatively be passed directly through the hollow shaft 34 to the modulation tool holder assembly 10.

The wires 25 can then be connected to the linear actuator 11 of the modulation device and/or any related sensors used for monitoring or feedback control of the modulation device 10. In addition to providing a novel solution for providing power or control signals to and from the modulation tool holder assembly 10, the rotating electrical connector 32(*a*) is very compact in size, has no moving parts, and enables relatively high rotational speeds, in comparison to the contacts in a slip ring system.

Further, additional provisions can be made for one or more sensors or sensor arrays. These sensors or sensor arrays can be located at various points on the assembly length. For example, sensors and sensor arrays can be positioned at the cutting tool 12, the actuator 11, the spindle 31 (or 51), and/or the hollow shaft 34, etc. Alternately, in some implementations the actuator can be a combination unit consisting of an actuator and a sensor array.

These sensor arrays can provide a variety of information including but not limited to sensing temperature, pressure, magnetic flux, sound, etc.

The sensor provided information can enable a variety of features in addition to those already provided and discussed above. These features include sensors for determining conditions, that enable the tool's operation to be altered to compensate for a variety of conditions. For example, the modulation rate of the tool may be altered to compensate for temperature, perceived acoustic resonance, tool wear, changes in spindle rotation speed, and/or unexpected changes in the object being cut (e.g., density, hardness, etc.). Further, power to the linear actuator 11 can be regulated based upon sensor provided data.

Upon such input or inputs to the sensors or sensor arrays, signals can be transmitted along the same or similar passageways used by the signal and control wires 25, 33 (or 53), and the sensors can signal the modulation controller 102 and/or the machine controller to vary specific parameters, including but not limited to, modulation frequency and/or amplitude; spindle and/or tool holder rotation speed; and/or fluid discharge rate. The external controller or controllers can then vary parameters based on the sensor outputs according to preset and/or automatic schedules.

Preferably, sensors are employed that provide alarm actuating outputs or that cause operation of the tool to cease or be changed if a certain parameter reaches a predetermined caution or danger level. Examples of such conditions include the temperature exceeding 10% of the expected output, spindle rotation rate 10% below expected output, etc. The triggering of an alarm by a sensor may indicate to the machine operator that a manual inspection be performed, which inspections may cause the operator to pause machining until an appropriate inspection is completed.

Along with the electrical power and/or signal control requirements for a rotating modulation tool holder assembly 10, the assembly 10 must often be capable of delivering high-pressure cutting fluids to cutting tools (e.g., drills) installed in the modulation tool holder assembly 10. Static fluid pressures of 30-300 bar or higher may be required to perform satisfactorily. The high-pressure fluid is typically delivered to the rotating machine spindle 31 through a rotary hydraulic union 38 (e.g., Deublin®, Inc and Ott®, Inc).

These rotating unions 38 components form the connection between the stationary proximal portion of device 30, and the rotating distal portion of the device. The rotating hydraulic coupling 38 enables the flow of high-pressure fluids through a stationary connection 38(*b*) that interfaces to the rotating spindle 31. The rotary hydraulic union 38 also includes a rotating section 38(*a*) connected directly to the distal end of the machine spindle 31 and a stationary section 38(*b*) that is connected directly to a fixed position in the distal portion machine tool 39. Examples of high pressure cutting fluids include liquids (e.g., oil-based, kerosene, alcohol, compressed gases, etc.); pastes/gels (e.g., fatty alcohols, wax, etc); aerosols/mists; and/or gases (e.g., carbon dioxide, nitrogen, oxygen, etc. These fluids can be supplied, as depicted, through a radially extending connector 43 that is coupled on the stationary section 38(*b*) of the rotating hydraulic union 38.

In other embodiments, the fluid can be supplied by one or more connectors or passages that introduce the fluid to the device 30 at positions, or to structures other than coupling 43. These positions and structures may be either internal or external to the assembly. In some implementations, several fluid receiving structures can be employed for introducing a variety of a plurality of fluids to the assembly 30.

Further, different connectors can be used, with the different connectors being designed for introducing different fluids depending on the needs of the cutting operation. For example, oil-based lubricants can be supplied through a first connector; compressed gases can be supplied for specific applications through a second connector, etc. Preferably, a valve is provided within the system so that the flow of these fluid supplies can be regulated as necessary by the operator and/or controller.

Referring again to FIG. 2, the present invention also introduces a novel modification to the rotary hydraulic union 38 that enables the hollow shaft 34 from the modulation device to pass directly through the longitudinal axis of the stationary section 38(*b*) of the rotary union 38 for supplying the high-pressure fluid. This configuration, as depicted, utilizes a linear bearing sleeve 41, such as a bronze bearing or miniature roller bearing—installed into a rotary coupling, here depicted as retainer 42, to maintain the centric position of the hollow shaft 34 while supporting the rotary motion.

This retainer 42 and bearing sleeve 41 are simultaneously coupled with a rotary shaft seal 40 that prevents fluid leakage. Thus, high-pressure fluid flows from the fluid supply port connection 43; into the stationary section of the rotary union 38(*b*); through the rotating section of the rotary union 38(*a*); around the hollow shaft 34 and linear actuator 11, and through the cutting tool 12 to the cutting surface.

Thus, particular embodiments of the subject matter have been described.

Other embodiments are within the scope of the following claims. In some cases, the actions and structures recited in the claims can be performed in a different order and/or with different components and still achieve desirable results.

What is claimed is:

1. A modulating tool holder for holding a rotatable tool for engaging a workpiece, the tool holder being configured for mounting to a rotatable spindle of a machine apparatus, the tool holder comprising; a proximal end, a distal end, and an axis extending between the proximal end and the distal end, a body having a centrally disposed axially extending passageway, a linear actuator capable of sinusoidal axial linear movement disposed in the axially extending passageway, the linear actuator being centrally disposed in the axial passageway along the axis of the tool holder, a bearing member located in the axially extending passageway, a fluid passageway for conducting a fluid from a position proximal of the linear actuator to a position distal of the linear actuator, wherein the fluid passageway does not permit contact between the fluid and the linear actuator, a portion of the fluid passageway extending axially though the body in a direction generally parallel to the axis of the tool holder, but being disposed radially outwardly of the linear actuator and the bearing member, and wherein the fluid passageway does not permit contact between the fluid and the bearing member, and a tool engaging member for engaging a cutting tool, wherein the linear actuator is positioned for axially moving, in a cyclic linear manner, a rotating cutting tool engaged by the tool engaging member in a cyclic manner that creates an intermittent gap between the tool and the workpiece; further comprising a plurality of fluid passageways disposed radially outwardly of the linear actuator and the bearing member.

2. The tool holder assembly of claim 1 wherein the linear actuator operates in a frequency range of generally less than about 1000 cycles per second.

3. The tool holder of claim 2 wherein the body includes a sleeve portion having an axial extending central passageway for receiving the linear actuator, the bearing member, and the tool engaging member, and an axially extending portion of the fluid passageway for conducting fluid, the axially extending portion of the fluid passageway of the sleeve being disposed radially outwardly of the fluid passageway of the body portion.

4. The tool holder of claim 1 wherein the tool holder comprises a tool holder nose having an axially extending passageway for receiving a cutting tool, shaft and a rotating bearing.

5. The tool holder of claim 1 wherein the body includes a body portion having at least one axially extending portion of the fluid passageway, a sleeve portion having an inner surface defining at least a portion of the axial passageway and an outer surface, and an internal passageway disposed between the inner surface and the outer surface, the internal passageway, comprising at least one axially extending portion of the fluid passageway, and a radially extending surface defining a radially extending portion of the fluid passageway and wherein the tool engaging member includes an axially extending central passageway, and at least one radially extending portion of the fluid passageway for directing fluid from the portion of the fluid passageway of the sleeve to the central passageway of the tool engaging member.

6. The tool holder of claim 5 farther comprising a cutting tool disposed in the axially extending central passageway of the tool engaging member, wherein the cutting tool includes an axially extending fluid passageway for conducting fluid from the central passageway, and through the cutting tool for permitting the fluid to impact a work piece upon which the cutting tool is performing an operation.

7. A tool holder of claim 1, further comprising a shaft member disposed between the linear actuator and a cutting tool held by the tool engaging member wherein the linear actuator is operable to impart the sinusoidal linear movement to a cutting tool engaged by the tool engaging member in a direction parallel to a rotational axis of the tool.

8. The tool holder of claim 1, wherein the body includes:
a sleeve portion having surface for defining a first annular ring groove; and a body portion having a surface defining a second annular ring groove, wherein the first and second ring grooves are aligned for conducting fluid in a radial direction in the fluid passageway.

9. The tool holder of claim 1, further comprising:
a sensor array for sensing at least one operational condition of the tool holder; and
a set of wires, wherein the wires serve to transmit signals from the sensor array to the machining apparatus for permitting a user to adjust an operational parameter of the tool holder.

10. The tool holder of claim 1, further comprising:
a tail cap disposed between the linear actuator and the fluid passageway for preventing the linear actuator from coming into contact with the fluid; and
a circular stop ring rigidly fixed to the outer diameter of the tool holder.

11. The tool holder of claim 1 further comprising:
a rotating spindle for securing the tool holder to the machining apparatus;
a rotary electrical connector configured to provide power from a power source to the tool holder; and
a rotary hydraulic coupling assembly connected to the rotating spindle for permitting fluid to be delivered to the fluid passageway.

12. The tool holder of claim 11 further comprising:
a cylindrical shaft;
an insulating coupling for attaching the cylindrical shaft to the rotary electrical connector;
linear bearing for securing the cylindrical shaft within the body; and
a fluid passageway extending between the rotary hydraulic coupling assembly and the tool holder assembly.

13. The tool holder of claim 11 further comprising a rotary ball assembly disposed distally of the linear actuator, and proximally of tool engaging member, wherein the linear actuator is operable to modulate translational movement of the rotary ball-spline bearing assembly with a superimposed oscillation in a direction parallel to an axis of rotation of the rotating spindle further comprising a hydraulic coupling including a stationary portion and a rotatable portion.

14. The tool holder of claim 1 further comprising a rotating spindle secured to the machine apparatus for coupling the tool holder to the machine apparatus, further comprising a coupler for releasably coupling the spindle to the tool holder for permitting replacement of the tool holder on the spindle.

15. The tool holder of claim 14 wherein the coupler is engageable with the tool replacement device for permitting the tool holder to be machine-attached and machine-removed from the spindle, wherein the attachment and removal includes coupling an electrical connector between the spindle and the tool holder.

16. The tool holder of claim 1 comprising a rotatable electrical coupling including a liquid metal contact for conducting power from a stationary power source to the linear actuator.

17. A machine tool holder for coupling to a machine apparatus for machining a work piece, the tool holder comprising—a body configured for being secured to a tool block of the machining apparatus, a ball-spline bearing assembly encased within the tool holder having an axially extending passageway and an axis, a tool engaging nose rigidly coupled to the ball-spline bearing assembly such that the tool nose is capable of movement parallel to a rotational axis of the tool block, and a linear actuator centrally disposed in the axial passageway along the axis of the tool holder, encased within the body and configured to actuate the ball-spline bearing assembly to move in cyclic linear manner in a direction parallel to a rotational axis of the tool block; a cutting tool coupled to the tool engaging nose for rotational and linear movement with the tool engaging nose; a controller and signal conductor for continuously imparting power to the linear actuator for imposing a desired oscillating movement upon the cutting tool relative to the work piece for causing instantaneous and periodic separation between the cutting tool and the work piece at a region of contact between the cutting tool and the work piece; and a fluid passageway for conducting a fluid from a position proximal of the linear actuator to a position distal of the linear actuator, wherein a portion of the fluid passageway extends axially though the body in a direction generally parallel to the axis of the tool holder, wherein the fluid passageway is disposed radially outwardly of the linear actuator, and wherein the fluid passageway does not permit contact between the fluid and the linear actuator; further comprising a plurality of fluid passageways disposed radially outwardly of the linear actuator and the bearing member.

18. The machine tool holder of claim 17, wherein the fluid passageway is disposed radially outwardly of the ball-spline bearing assembly, and wherein the fluid passageway does not permit contact between the fluid and the ball-spline bearing assembly.

19. The machine tool holder of claim 17, wherein the fluid further comprises a high-pressure fluid.

* * * * *